Sept. 2, 1969　　　　M. C. HORNUNG　　　　3,464,498
SINGLE BAR BREAKER FOR EARTH CRUST
Filed June 6, 1966　　　　　　　　　　　　2 Sheets-Sheet 1
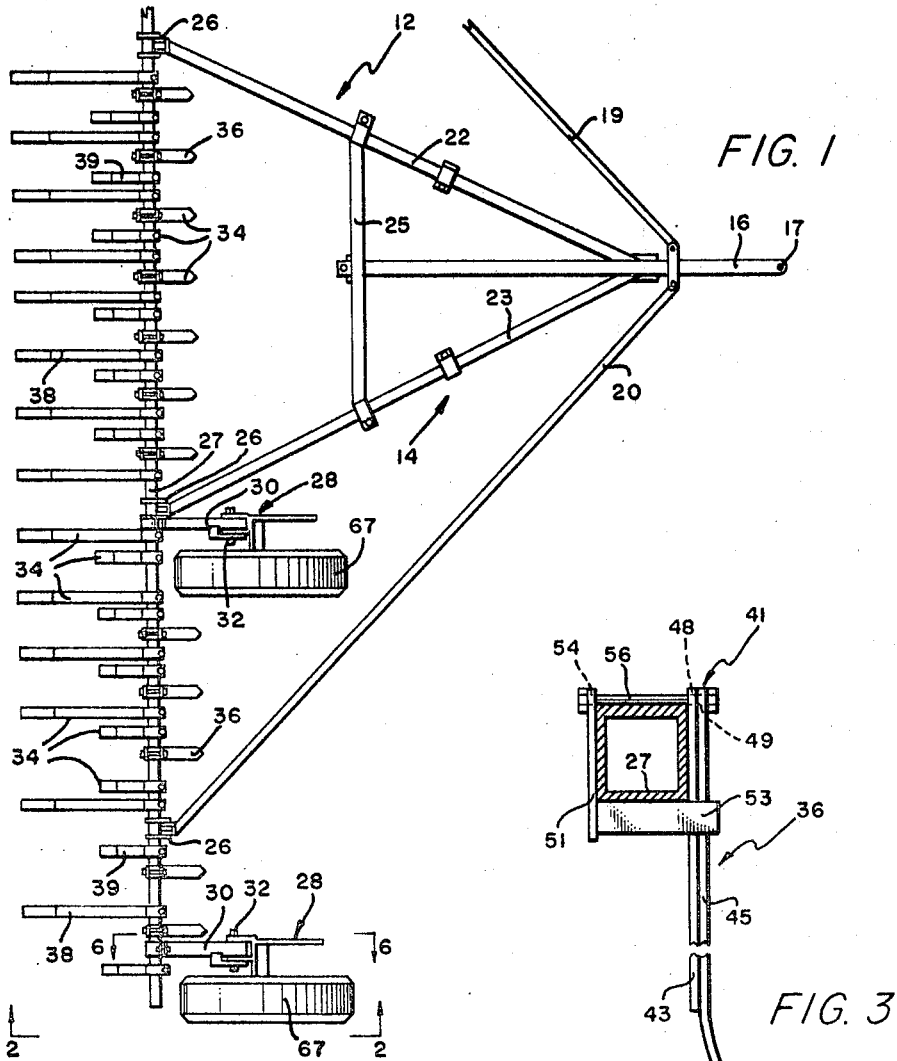
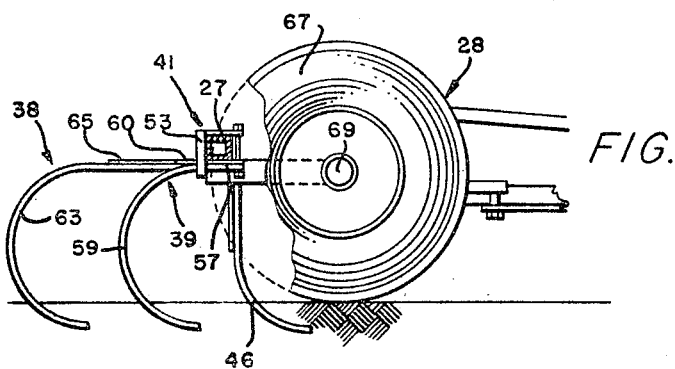
INVENTOR.
MICHAEL C. HORNUNG
BY
ATTORNEYS Sept. 2, 1969          M. C. HORNUNG          3,464,498

SINGLE BAR BREAKER FOR EARTH CRUST

Filed June 6, 1966          2 Sheets-Sheet 2

INVENTOR.
MICHAEL C. HORNUNG
BY *John H. Widdowson*
*Phillip A. Rein*
ATTORNEYS

United States Patent Office 3,464,498
Patented Sept. 2, 1969

3,464,498
SINGLE BAR BREAKER FOR EARTH CRUST
Michael C. Hornung, Spearville, Kans., assignor to American Products, Inc., Spearville, Kans.
Filed June 6, 1966, Ser. No. 555,574
Int. Cl. A01b 63/16, 19/02, 23/02
U.S. Cl. 172—421   4 Claims

ABSTRACT OF THE DISCLOSURE

This invention is harrow-type earthworking implement including a single support beam to which is connected a plurality of spaced rows of tooth members and having the same adjustably supported on spaced wheel means. More particularly, this invention is a farm implement having spaced tooth members attachable to a support beam to provide substantial rigidity and reaction force with the entire implement supported upon wheel means rigidly connected to support bars and operable to be readily adjustable but maintaining the required rigidity in a given adjusted position.

---

Various types of farm working implements are known to the prior art which operate to cultivate or break up the earth's surface in preparation for planting and the like. The prior art devices are normally constructed with an elaborate frame structure to which is connected a plurality of earthworking elements such as harrowing tooth members, disc members, and the like. These prior art devices are in many instances structurally complicated, requiring specially designed clamping and connecting means and therefore, are of a rather expensive construction. Additionally, the prior art earth's crust-breaking farm implements are of a substantial size and weight in order to support multiple tooth members while providing the necessary rigidness required in an earthbreaking operation, and, therefore, such devices are costly to manufacture, difficult to adjust for vertical height, and burdensome to transport from one location to another.

In accordance with preferred embodiments of the present invention, a new breaker apparatus for working the earth's crust or the like is provided which includes a rigid A-shaped frame connectible through a tongue member to the rearward hitch portion of a conventional farm tractor or the like. The frame is connected to a single transversely and horizontally extended support beam which, in turn, is connected to a plurality of rows of spaced, structurally different, tooth members. The frame is held in an elevated position by a plurality of wheel means adjustable connected to the support beam thereby providing for vertical depth adjustment of the tooth members which is deemed necessary in an earthworking farm operation. Additionally, the wheel means are adjustable to permit the frame and interconnected tooth members to extend substantially above the supporting ground surface for transport thereof.

In preferred specific embodiments of the invention, a new and novel ground working implement adapted for use with a farm tractor or the like is provided which includes an A-shaped frame means having a central, forwardly projecting tongue means connectible to, for example, the hitch of a farm tractor. The frame means has a plurality of horizontally extended support members all interconnected at the rearwardmost ends thereof to a transversely extended support beam, which, in turn, is supported above the ground surface by a plurality of spaced wheel means. The wheel means are interconnected to the support beam by forwardly projected support bars to which are pivotally connected the wheel means and held in a certain adjusted position by lock means. The wheel means have laterally extended shafts to which are connected lever arms having U-shaped clamp portions mounted about the support bars. Each lock means includes a clamp member having a U-shaped forward portion mountable about the support bar and a rearwardly extended portion mounted against the outer surface of the clamp member whereupon the wheel means is releasably held in a given adjustable rotational position by a bolt member extended through the adjacent ones of the rearward portion, the clamp portion, and the support bar. A plurality of ground working means are connected to the support beam including a row of first tooth members projected forwardly of the support beam, a row of second tooth members extended rearwardly of a support beam, and another row of intermediate tooth members extended downwardly between the first and second tooth members. The tooth members have tooth elements secured to the support beam by clamp members with reinforcing bars mounted between the tooth elements and the support beam for added rigidity thereof. The lever arms are rotatable about the bolt members to raise and lower the interconnected frame means for adjustable depth earthworking operations or for transporting on a highway or the like. It is seen that the first, second and intermediate tooth members are of such a size and shape and positioned on the support beam in such a manner that each tooth member contacts the working soil intermediate laterally of the other pair of tooth members and in a spaced relationship relative to the direction of travel so that a complete and thorough earthworking and plowing or harrowing-type operation is achieved.

Accordingly, it is an object of this invention to provide a new agricultural earthworking implement.

Another object of this invention is to provide a new farm implement for breaking the earth's crust having a plurality of spaced rows of tooth members engageable therewith.

Still another object of this invention is to provide a new earthworking implement having a basic frame, a plurality of tooth members attached to the basic frame, and wheel means mounted to the basic frame operable to selectively adjust the working height of the tooth members.

One other object of this invention is to provide a new earthworking farm implement having a plurality of aligned rows of spaced tooth members engageable with the working soil in horizontally spaced rows with all the tooth members connected to a single horizontal support beam whereby a rugged, compact structure is provided.

Still, a further object of this invention is to provide an earthworking farm implement having a new and novel wheel means that is readily vertically adjustable for transport or earthworking operations.

Still one other object of this invention is to provide a farm implement for working the earth's crust provided with a wheel means having a connecting means that provides quick, easy, and simple adjustment thereof to control the working depth of the implement.

Yet, another object of this invention is to provide a new earthworking farm implement in which the arrangement and spacing of the tooth members can be quickly and easily varied.

A still further object of this invention is to provide a new earthworking farm implement having a frame means, a support beam connected to the frame means, and a plurality of tooth members secured to the support beam having working tips thereof engageable with the supporting earth's crust for working thereof at various multiple, horizontal positions.

A further object of this invention is to provide a new farm implement that is rigid in construction, economical to manufacture, simple to operate, and readily portable.

Various other objects, advantages and features of the invention will become apparent to those skilled in the art from the following discussion, taken in conjunction with the accompanying drawings in which:

FIG. 1 is a fragmentary top plan view of the preferred specific embodiment of the farm implement of this invention;

FIG. 2 is a fragmentary elevational view taken along lines 2—2 in FIG. 1;

FIG. 3 is an enlarged elevational view of a first spring tooth member of the farm implement of this invention;

Figure 4:
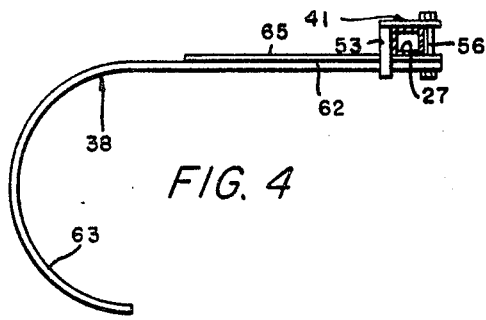
FIG. 4 is an enlarged elevational view of a second tooth member of the farm implement of this invention.
Figure 5:
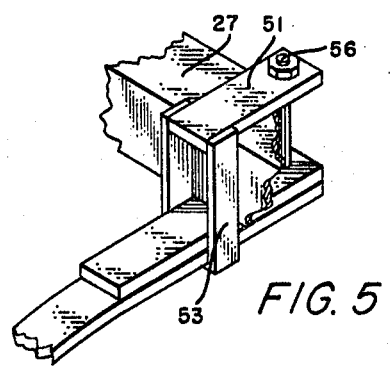
FIG. 5 is a fragmentary enlarged perspective view of a clamp means of this invention showing the attachment of one tooth member to a support beam therefor.

The following is a discussion and description of preferred specific embodiments of the new earthworking farm implement of this invention, such being made with reference to the drawings whereupon the same reference numerals are used to indicate the same or similar parts and/or structure. It is to be understood that such discussion and description is not to unduly limit the scope of the invention.

Referring now to the drawings in detail, in particular to FIG. 1, there is shown a specific embodiment of a harrow-type farm implement 2 of this invention connected to a conventional farm tractor or the like. The farm apparatus or implement 12 of this invention has a generally horizontally, disposed A-shaped frame means 14 having a tongue member 16 provided with an aperture 17 therein to facilitate connection of the tongue members 16 and interconnected frame means 14 to a tractor or other pulling vehicle. A pair of forwardly converging elongated members 19 and 20 form a portion of the frame means 14 and are interconnected at the forwardmost end thereof to the tongue member 16. A second pair of opposed forwardly converging support members 22 and 23 are similarly secured to the tongue member 16 and interconnected rearwardly therefrom by a cross member 25 also connected to the tongue member 16. The rearwardmost ends of the elongated members 19, 20 and support members 22, 23 are pivotally connected to support brackets 26 secured to a horizontally disposed, transversely extended, support beam 27 formed of a square or rectangular tubing material. The frame means 14 is held in an elevated position by a plurality of spaced wheel means 28 secured to forwardly extended support bars 30, respectively, connected to the support beam 27. The wheel means 28 are secured to the support bars 30 by connecting or lock means 32 providing for pivotal movement of the wheel means 28 relative to the frame means 14 so as to selectively adjust the height of the same relative to the supporting ground surface. A plurality of ground working means 34 are mounted on the transversely extended support beam 27 in spaced relationships providing for working engagement with the supporting ground or earth crust surface as will be explained.

The ground working means 34 consists of a row of forwardly projected first tooth members 36, another row of second tooth members 38 extended rearwardly of the support beam 27, and a third row of intermediate tooth members 39 mounted between the aforementioned other tooth members. More specifically, as shown in FIG. 3, the first tooth members 36 consists of flexible tooth bodies or elements secured to the support beam 27 by clamp members 41 and having reinforcing bars 43 mounted therebetween. Each first tooth element has a linearly extended support section 45 integral with a downwardly depending forwardly curved working portion 46 engageable with the soil to be turned. The reinforcing bar 43 is of a length substantially identical to that of the support section 45 and having an upper hole 48 therein positionable into alignment with a hole 49 in the top portion of the support section 45 for mounting purposes. Each clamp member 41 has a support plate 51 mounted against the back side of the support beam 27 and an integral forwardly projected support channel 53 through which the reinforcing bar 43 and the support section 45 of the tooth member 36 are extended. An upper portion of the support plate 51 has a hole 54 therein in axial alignment with the holes 48 and 49 whereby a bolt member 56 is extended therethrough to securely clamp the first tooth member 36 to the support beam 27. This results in rigidly securing the first tooth member 36 against forward movement while permitting rearward, flexible movement within the support channel 53 about the lower forward corner of the support beam 27 to provide a substantially rigid structure; however, permitting flexibility of the first tooth member 36 under excessive loads.

As shown in FIG. 2, the intermediate tooth member 39 similarly has a linearly extended shank portion 57 integral with an arcuate portion 59 having a working tip on the outer end thereof engageable with the working soil. One of the clamp members 41 is similarly used to secure the intermediate tooth member 39 to the support beam 27 with a similar but shorter reinforcing bar member 60 mounted therebetween. The support channel 53 extends vertically and, therefore, restricts downward movement of the shank portion 57 but permits upward, flexing movement thereof about the lower rearwardmost corner of the support beam 27 thereby providing for safety during excessive loads.

Similarly, as shown in FIG. 4 each second tooth member 38 has an elongated, horizontally extended linear shank section 62 integral with a downwardly depending curved portion 63 having a working tip engageable with the soil. One of the clamp members 41 similarly secures each second tooth member 38 to the support beam 27 having an elongated reinforcing support bar 65 mounted between the support beam 27 and the shank section 62 thereby providing substantial rigidity while permitting rearward upward flexing movement of the curved portion 63. Also, it is seen that the support channel 53 of the clamp member 41 on the second tooth member 38 operates to permit upward pivotal movement but restricts downward movement similar to that described for the intermediate tooth member 39 which is identically mounted.

The intermediate tooth members 39 are positioned centrally between the other tooth members 36 and 38 in both directions, namely, laterally and relative to the path of travel of the implement 12, whereby this staggered relationship thereof results in a thorough and efficient working of the earth's crust. It is obvious that the tooth members can be adjutsed laterally to achieve the desired harrowing action on the soil to be worked.

Figure 6:
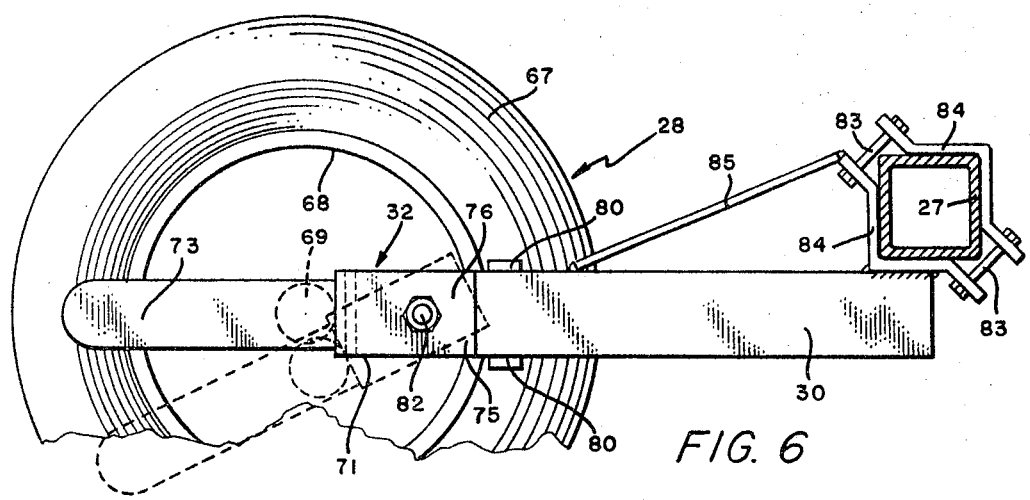
FIG. 6 is an enlarged fragmentary sectional view taken along lines 6—6 in FIG. 1.
Figure 7:
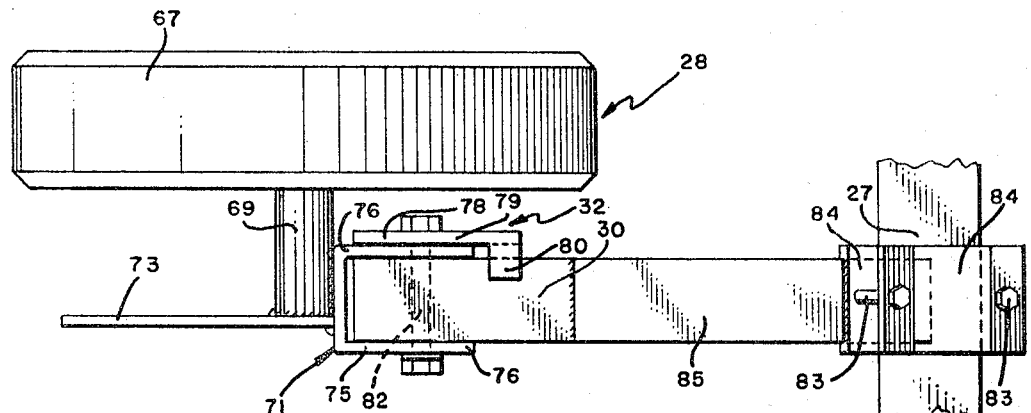
FIG. 7 is a fragmentary top plan view of a wheel means of the farm implement of this invention as illustrated in FIG. 6.

As shown in FIGS. 6 and 7, the wheel means 28 includes a tire 67 conventionally mounted for rotational movement on a rim and hub assembly 68. Each wheel means 28 has a laterally extended shaft 69 with one end secured as by welding to the rim and hub assembly 68 and the other end secured to an actuator or lever arm 71 of the lock means 32. The lever arm 71 has a handle section 73 integral with a U-shaped connector section 75 having parallel legs 76 mounted about opposite parallel sides of the support bar 30. A latch member 78 having a plate section 79 integral with a U-shaped guide section 80 is mounted with the guide section 80 on opposite horizontally extended sides of the support bars 30 and the plate section 79 against the outer surface of one leg 76 of the connector section 75. A bolt member 82 mounted through axially aligned holes in the plate section 79, the legs 76, and the support bar 30 is operable to securely hold each wheel means 28 in a given pivotal position relative to the respective support bars 30. It is obvious that the contact between the adjacent surfaces of the latch member 78 and the one leg 76 in conjunction with the retaining guide section 80 cooperate, respectively, to maintain each wheel means 28 in a given adjusted position.

The forward end of each support bar 30 is secured to the support beam 27 by a pair of clamp detents 84, one of which is welded to the support bar 30 and the other one is connected to the first as by bolts 83. A reinforcing gusset member 85 is welded between the one clamp detent 84 and the support bar 30 for added rigidity. It is seen that the support beam 27 and the support bars 30 are extended in a substantially horizontal position while pivotal movement of the wheel means 28 about the bolt members 82 operates to raise or lower the frame means 14 for transporting or for working of the soil, respectively.

In the use and operation of the farm implement 12 of this invention, the tongue member 16 is attached to the hitch of a tractor or other towing vehicle, and the handle section 73 is rotated to the position as shown in dotted lines in FIG. 6 to elevate the ground working means 34. This permits movement of the implement 12 from one location to another without interference with the supporting ground surface.

On reaching the ground surface area to be worked, the bolt member 82 is loosened slightly to permit rotation of the handle section 73 clockwise as viewed in FIG. 6, to raise the wheel means 28 and set the proper depth of the ground working means 34 whereupon the bolt member 82 is tightened to hold the same in this selected position. As shown in FIG. 2, the first, second, and intermediate tooth member 36, 38 and 39, respectively, are secured to the single support beam 27 and engageable with the earth's crust in spaced intervals relative to the path of travel. Additionally, each tooth member is laterally spaced between the other pair of tooth members which results in a multiple contact of the supporting soil successively, in order of the rows of the first tooth members 36, the intermediate tooth members 39, and the second tooth members 38 for a thorough earthworking operation.

The farm implement of this invention provides a simplified structure resulting in efficient and effective soil working operation with a minimum of initial investment and maintenance. The single bar earth breaker surface presents a compact, economical frame assembly movable with a minimum of power requirement and effort.

As will be apparent from the foregoing descriptions of the preferred embodiments of the applicant's earthworking farm implement, relative simple and inexpensive means has been provided which is easily attachable to a conventional farm tractor or the like so as to provide a light weight, highly maneuverable harrow-type structure usable with a minimum of power requirement. Applicant's novel wheel means structure eliminates a great deal of time consuming and tedious work involved in vertically adjusting the depth of the ground working means which results in a considerable monetary savings.

While the invention has been described in conjunction with preferred specific embodiments thereof, it will be understood that this description is intended to illustrate and not to limit the scope of the invention, as defined by the following claims.

I claim:

1. A tractor drawn farm implement for breaking the earth's crust, comprising:
   (a) a substantially horizontally disposed rigid frame having a tongue portion connectible to the farm tractor,
   (b) a single transversely extended support beam connected to said frame,
   (c) a plurality of wheel means,
   (d) means adjustably connecting said wheel means to said support beams for vertical movement thereof relative to the supporting ground surface,
   (e) a plurality of ground working means secured to said support beam having rows thereof engageable in a plurality of horizontally spaced positions with the earth crust for the breaking thereof,
   (f) said connecting means having lever arms connected to said wheel means, horizontal support bars adjustably secured to said support beam through clamp detents and a gusset member, means pivotally connecting said lever arms to said support bars operable to lock said wheel means in a selected vertical position relative to said support beam, and
   (g) said lock means including clamp members having forward retaining guide sections mounted about said support bars and rearward portions engageable with said lever arms, respectively, and bolt members mounted transversely of said clamp members, said lever arms, and said support bars operable to secure said wheel means in a given adjusted position by binding a portion of said lever arms between said clamp members and said support bars.

2. A farm implement as described in claim 1, wherein:
   (a) said ground working means having a row of first tooth members extended forwardly of said support beam, a row of second tooth members extended rearwardly of said support beam, and a row of intermediate tooth members positioned between said first and second tooth members,
   (b) said first, second, and intermediate tooth members each positioned between pairs of the other tooth members whereby the earth's crust is completely broken up by the three stage cooperation of said tooth members,
   (c) said first, second, and intermediate tooth members including elements having lower curved working portions engageable with the earth's crust, clamp members securing said elements to said support beam, and reinforcing bars mounted between said clamp members and said support beam to add rigidity to said elements, and
   (d) said clamp members each including a support channel secured to a support plate and operable with a bolt member connected to said support plate, said reinforcing bar, and one of said tooth members to clamp said reinforcing bar and said tooth member against said support beam whereupon said tooth member is pivotable about a contacting edge of said support beam in one direction and restricted against pivotal movement in the other direction by said support channel providing the desired rigidity in one direction and flexibility in the other for the earthworking conditions.

3. A farm implement as described in claim 1, wherein:
   (a) said retaining guide section of U-shape having leg portions engageable with upper and lower surfaces of said support beam, and
   (b) a laterally extended elongated handle section secured to said lever arms usable to easily pivot and lift said wheel means about said support base, respectively, when adjusting same for particular earthworking condition.

4. A farm implement as described in claim 2 wherein:
   (a) said first tooth member having a main support section extended substantially vertical with said arcuate working portion integral therewith engageable with the ground soil and said support section positioned forwardly of the other said tooth members with the rigid vertical position of said support section adapted to receive the brunt of the earth breaking operation.

(References on following page)

References Cited

UNITED STATES PATENTS

| | | | |
|---|---|---|---|
| 251,900 | 1/1882 | La Dow | 172—142 |
| 2,430,223 | 11/1947 | Goode | 172—708 X |
| 2,915,318 | 12/1959 | Chesser | 280—43 |
| 3,039,540 | 6/1962 | Ward | 172—451 X |
| 3,077,231 | 2/1963 | Hamilton | 172—421 |

FOREIGN PATENTS 1,936 AD/1903 Great Britain.

ROBERT E. BAGWILL, Primary Examiner

J. W. PETERSON, Assistant Examiner

U.S. Cl. X.R.

172—669